United States Patent [19]

Hull et al.

[11] Patent Number: 5,078,309
[45] Date of Patent: Jan. 7, 1992

[54] COMBINATION GUN RACK AND DOG GUARD

[76] Inventors: Harold L. Hull, 401 Canyon Way, SP43; Richard A. Corron, Sr.; Melinda Corron, both of 2607 Wabash Cir., all of Sparks, Nev. 89434

[21] Appl. No.: 623,185

[22] Filed: Dec. 3, 1990

[51] Int. Cl.⁵ .............................................. B60R 7/00
[52] U.S. Cl. .............................. 224/42.45 R; 224/913; 211/64; 296/24.2
[58] Field of Search ......... 224/913, 42.45 R, 42.46 R, 224/42.43, 273, 311; 211/64; 296/3, 24.1, 24.2; 42/94; 89/37.04

[56] References Cited

U.S. PATENT DOCUMENTS

| | | | |
|---|---|---|---|
| 2,729,196 | 1/1956 | Breitenbach | 296/3 |
| 2,982,579 | 5/1961 | Greenwald | 296/24.1 |
| 2,997,331 | 8/1961 | Kudner | 296/24.1 |
| 2,998,279 | 8/1961 | Mateny | 296/24.1 |
| 3,261,521 | 7/1966 | Meccico et al. | 211/64 X |
| 3,618,785 | 11/1971 | Newman | 211/64 X |
| 4,058,221 | 11/1977 | Elkins et al. | 224/42.45 R X |
| 4,450,989 | 5/1984 | Bogar, Jr. | 224/42.45 R |
| 4,648,516 | 3/1987 | Elkins | 224/42.45 R X |
| 4,776,471 | 10/1988 | Elkins | 224/42.45 R X |
| 4,991,723 | 2/1991 | Elkins | 224/42.45 R X |

*Primary Examiner*—Henry J. Recla
*Assistant Examiner*—Glenn T. Barrett

[57] ABSTRACT

A mounting rack for rifles which is substantially rectangular and is mounted across the vehicle, which is adjustable in length as well as height to fit substantially any vehicle. The two upright sides of the rectangle, slide on the two long cross members for further adjustment and the gun cradles have multiple positions. The invention further discloses a dog guard which may be affixed to the back of the gun rack.

9 Claims, 3 Drawing Sheets

COMBINATION GUN RACK AND DOG GUARD

FIELD OF THE INVENTION

This invention relates to gun racks and more particularly to a gun rack which mounts across a vehicle from opposed windows instead of against a side wall and may also include a dog guard screen.

BACKGROUND OF THE INVENTION

Gun racks for vehicles are not new and in the prior art many styles of gun racks are taught which include racks that must be installed by hardware on the existing framework of the vehicle or those which use a blade to engage the window and the resilient molding which encircles the edge of the window such as U.S. Pat. Nos. 4,450,989 or 4,776,471. Most of these teach two upright structures with some being adjustable in height with support cradles for guns or the like, however, this type of gun rack is not suitable to be mounted across a vehicle and this invention addresses this and other problems in the prior art.

SUMMARY OF THE INVENTION

It is a primary object of the present invention to provide a gun rack which removably mounts across a vehicle between any two opposed windows.

It is a further object to provide not only vertical adjustment to accommodate various window heights but to also accommodate various widths of vehicles which may vary substantially in width.

It is yet another object to provide cradles which ma be positioned at various heights on the vertical uprights to accommodate different styles of guns such as rifles with scopes or the like.

Still another object is to provide adjustable means to allow the two upright members to be adjustable in relation to each other and may be positioned close together or far apart.

Yet another important object is to provide a removably attached dog guard screen which uses the frame work of the rack as a support means.

Another object is to provide attachment means to the window and window molding which does not require any modification of the vehicle.

Other objects and advantages will become apparent when taken into consideration with the following drawings and specifications.

DETAILED DESCRIPTION OF THE DRAWINGS

Figure 2:
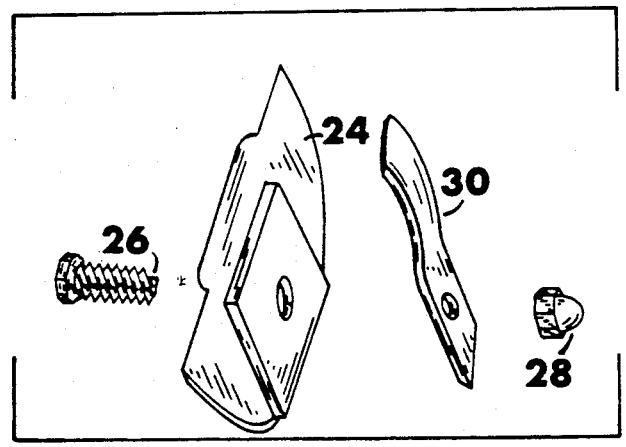
FIG. 2 is an exploded perspective view of the window mounting means.
Figure 3:
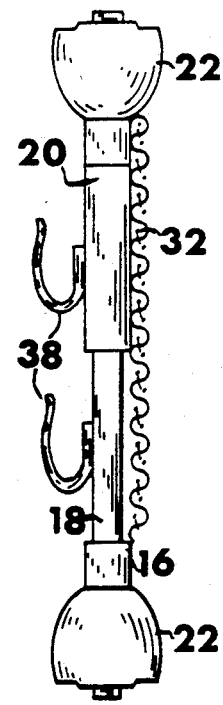
FIG. 3 is a side view of FIG. 4.
Figure 4:
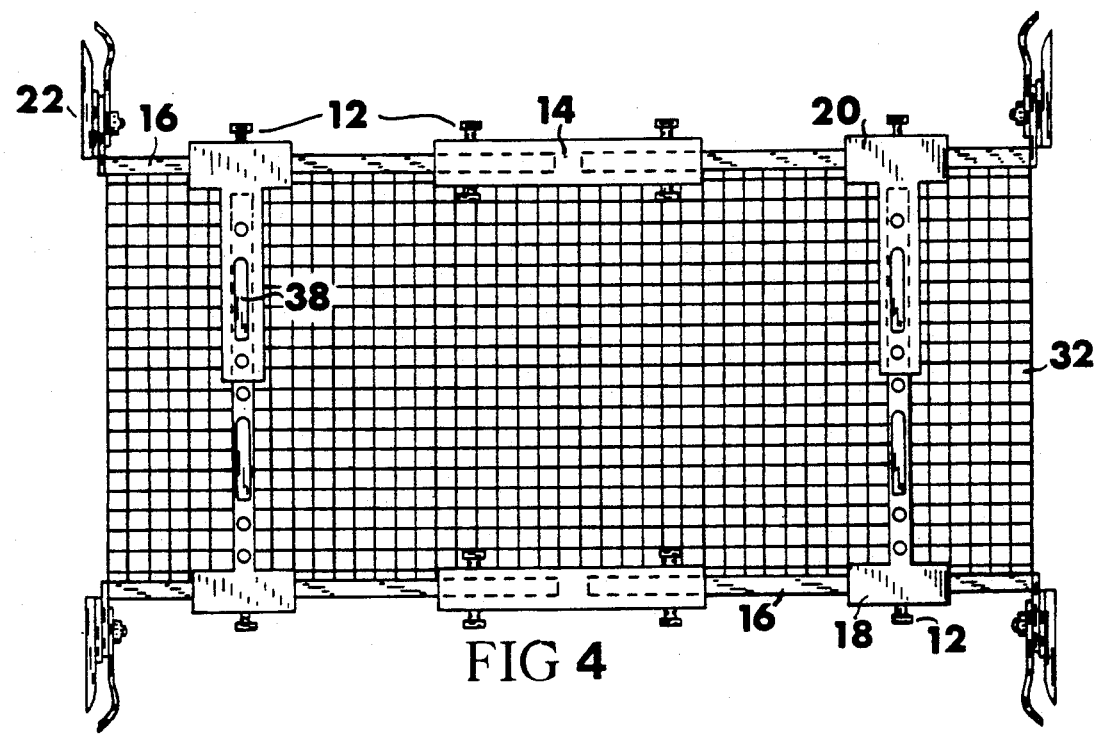
FIG. 4 is a frontal view.
Figure 5:
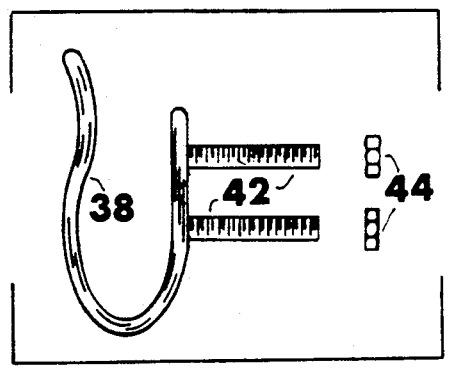
FIG. 5 is a side view of the gun cradle.
Figure 6:
FIG. 6 is an enlarged perspective view of the top T section.
Figure 7:
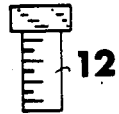
FIG. 7 is a side view of a threaded retaining bolt.
Figure 8:
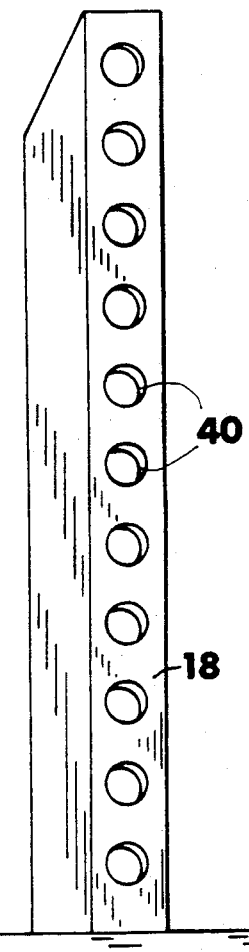
FIG. 8 is an enlarged perspective view of the bottom T section.
Figure 9:
FIG. 9 is an enlarged perspective view of the center cross section.
Figure 10:
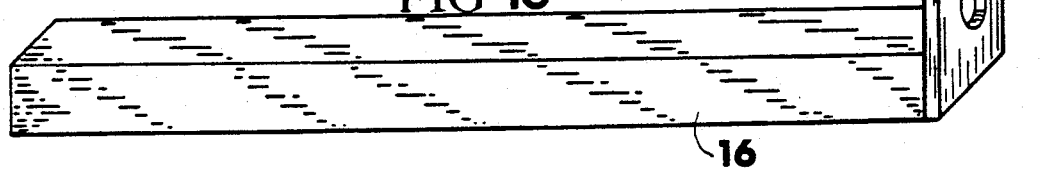
FIG. 10 is an enlarged perspective view of the end section.

Referring now to the drawings in detail wherein like numerals represent like parts, 10 is substantially an assembled frame which is made up of square tubing of two sizes, with the smaller sizes telescoping into the larger sizes and locked into place by threaded bolt 12, 14 being a center section with 16 being the outer sections slidably engaging section 14 and upright T sections 18 or upright T section 20, with section 16 having mounting slot 17 releaseably holding window attaching means 22, window attaching means being made up of blade 24, attaching screw 26, nut 28 and clamp 30, as shown in FIG. 2.

32 is a dog guard made of screen material which affixes to the back side of frame 10 by screws 34 and washers 36 into threaded holes (not shown) in frame 10, while 38 are cradles which are releaseably secured through holes 40 in T frames 18 and 20, by bolts 42 and retaining nuts 44.

Figure 1:
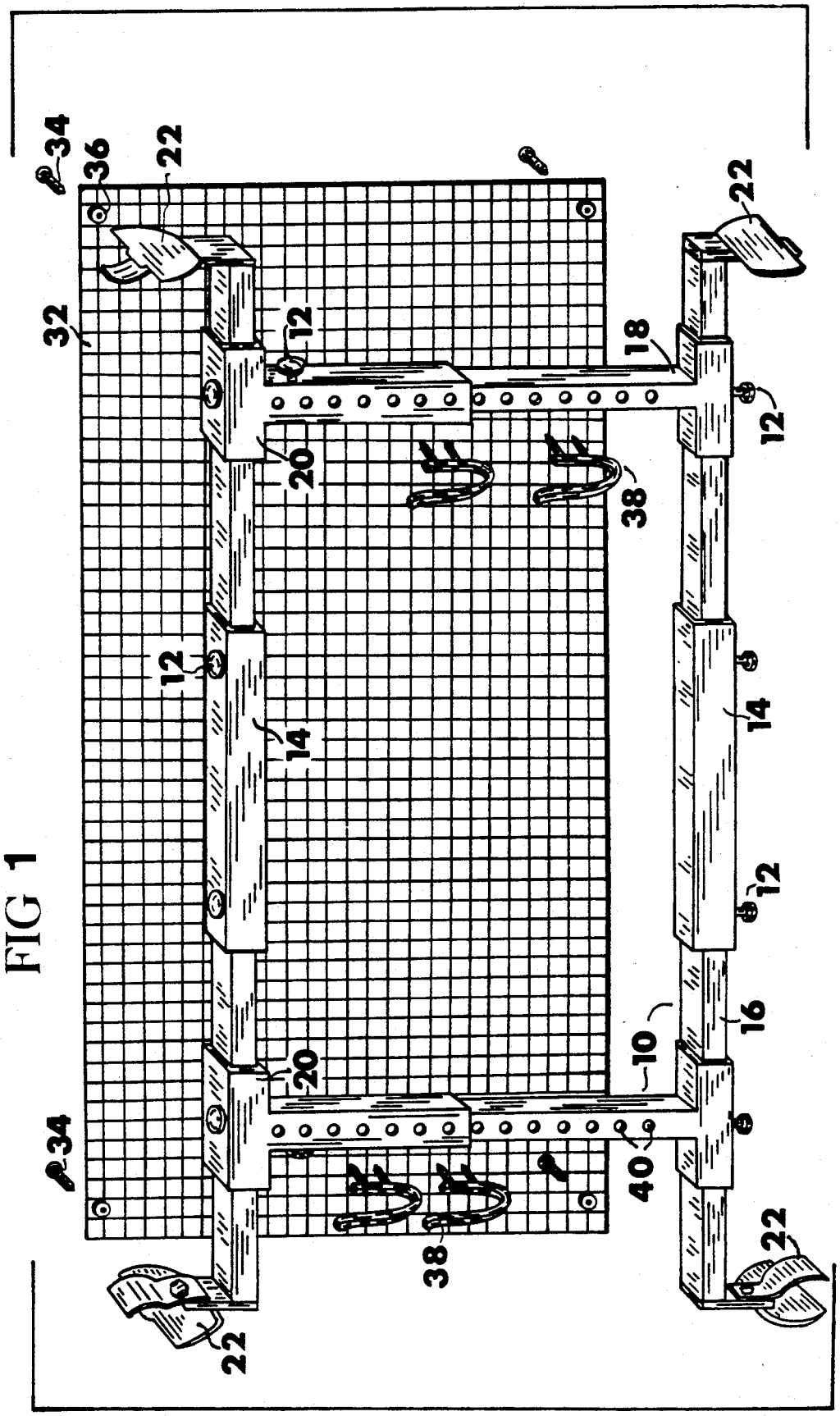
FIG. 1 is a partially exploded perspective view.

Now it will be seen, when the device is assembled as shown in FIG. 1 and threaded bolts 12 are in a loosened position that the device is now adjustable in height and width by sitting the two bottom window attaching means 22 on the window and window molding and raising the top two T members 20 to a height whereby the two top window attaching means engage the window and window molding. Now the T members 18 and 20 may be moved laterally along member 16 to a desired position in relation to each other and when all of the members are in the desired relationship the threaded bolts 12 are tightened to secure the device.

If desired the dog guard screen may now be affixed to the back of the device and held securely in place by bolts 34 and washers 36. Also the cradles may be attached at the desired levels and secured in placed by bolts 42 and nuts 44.

We have now provided a completely adjustable gun rack which may be adjustable in height and width with the upright support members holding the gun cradles also being adjustable in relation to each other. Also the gun cradles are adjustable in height in relation to each other to accommodate various rifles or rifles with scopes, etc.

We have also provided a gun rack that will fit substantially any vehicle without modification of the vehicle.

It will also be noted that we have provided a simple gun rack and dog guard screen that may be assembled, dis-assembled, installed and removed with no special tools being required.

It will also be seen that we have provided a gun rack which may be made of standard square metal tubing and requires no expensive molds, therefore is economical to build and manufacture.

Although the invention has been shown and described in what is conceived to be the most practical and preferred embodiment, it is recognized that departures may be made therefrom within the scope and spirit of the invention, which is not to be limited to the details disclosed herein but it is to be accorded the full scope of the claims so as to embrace any and all equivalent devices and apparatus.

Having described our invention, what we claim as new and desire to secure by patents is:

1. A gun rack adapted to be mounted to a vehicle having opposing windows comprising: a substantially rectangular rack having two longer sides and two shorter sides, said rack being made of square tubing; said two longer sides having telescopic means and means for locking said two longer sides in multiple positions; said two shorter sides having telescopic means and means for locking said two shorter sides in multiple positions; said two shorter sides having means to slidably engage said two longer sides, multiple gun cradles including means to affix said cradles has to said two shorter sides and , said two longer sides having distal ends and means located at said ends to releaseably attached said rack to said opposing windows.

2. The device of claim 1 in which said square tubing is metal.

3. The device of claim 1 in which said telescopic means for said two longer sides and said two shorter sides is for said longer sides and said shorter sides to be made in at least a first and second sections, said first sections being of a different size than said second sections, said first sections slidably engaging and fitting inside said second sections.

4. The device of claim 1 in which said means for said two shorter sides to slidably engage said two longer sides is a T section at distal ends of said shorter sides, said T section being of a different size than said two longer sides, said T section slidably engaging and fitting over said two longer sides.

5. The device of claim 1 in which means for said cradles to be affixed to said two shorter sides is multiple bolts and nuts cooperating with matching multiple holes in said two shorter sides.

6. The device of claim 1 in which said means to attach said two longer sides at their distal ends to opposing windows is a blade and clamp cooperating with said opposing window and window molding, said blade and clamp slidably affixed to said distal ends of said two longer sides by a bolt and nut.

7. The device of claim 1 in which each of said means to releasably lock said two longer sides, said two shorter sides, and slidably engage and lock said two shorter sides to said two longer sides in multiple positions is a bolt.

8. The device of claim 1 which includes a dog guard screen and means to fasten said dog guard screen to said rack.

9. The device of claim 8 in which said means to fasten said dog guard screen to said rack are multiple bolts and washers.

* * * * *